US009621884B2

(12) United States Patent
Kim et al.

(10) Patent No.: US 9,621,884 B2
(45) Date of Patent: Apr. 11, 2017

(54) METHOD AND APPARATUS FOR ESTIMATING A QUANTIZATION TABLE FOR A VIDEO IMAGE

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Jae-Hyun Kim, Seoul (KR); Jong-Beom Na, Daejeon (KR); Gun-Shik Shin, Suwon-si (KR); Seok-Bong Yu, Seoul (KR); Se-Hyeok Park, Seoul (KR); Gyu-Ha Choi, Suwon-si (KR)

(73) Assignees: SAMSUNG ELECTRONICS CO., LTD., Suwon-si (KR); KOREA ADVANCED INSTITUTE OF SCIENCE AND TECHNOLOGY, Daejeon-si (KR)

( * ) Notice: Subject to any disclaimer, the term of this patent is extended or adjusted under 35 U.S.C. 154(b) by 533 days.

(21) Appl. No.: 14/088,041

(22) Filed: Nov. 22, 2013

(65) Prior Publication Data
US 2014/0146881 A1    May 29, 2014

(30) Foreign Application Priority Data

Nov. 23, 2012  (KR) .................. 10-2012-0133633

(51) Int. Cl.
*H04N 19/00* (2014.01)
*H04N 19/124* (2014.01)
(Continued)

(52) U.S. Cl.
CPC ....... *H04N 19/0009* (2013.01); *H04N 19/124* (2014.11); *H04N 19/154* (2014.11); *H04N 19/176* (2014.11); *H04N 19/86* (2014.11)

(58) Field of Classification Search
USPC .............................. 375/240.24, 240.29, 240
See application file for complete search history.

(56) References Cited

U.S. PATENT DOCUMENTS 7,792,193 B2    9/2010  Tanizawa et al.
2004/0001637 A1*  1/2004  Mitchell .............. H04N 19/172
                                               382/239
(Continued)

FOREIGN PATENT DOCUMENTS

KR    2002-0000763 A    1/2002
WO       00/48405 A1    8/2000

OTHER PUBLICATIONS

Robertson, Mark A. et al., "DCT quantization noise in compressed images," IEEE Trans. Circuits Syst. Video Technol., vol. 15,No. 1, pp. 27-38, Jan. 1, 2005.
(Continued)

*Primary Examiner* — Jeremaiah C Hallenbeck-Huber
*Assistant Examiner* — Susan E Hodges
(74) *Attorney, Agent, or Firm* — Sughrue Mion, PLLC

(57) ABSTRACT

A method of estimating a quantization table for an image block, which is compressed in image processing, includes performing a first quantization using a table dictionary that includes a number of candidate quantization tables for the compressed image block; performing edge-related filtering on the compressed image block and performing a second quantization using the table dictionary for the filtered compressed image block; and estimating a quantization table for
(Continued)

the compressed image block based on energy costs of the first-quantized image block and the second-quantized image block.

14 Claims, 11 Drawing Sheets

(51) Int. Cl.
*H04N 19/176* (2014.01)
*H04N 19/154* (2014.01)
*H04N 19/86* (2014.01)

(56) References Cited

U.S. PATENT DOCUMENTS

| | | | | |
|---|---|---|---|---|
| 2004/0164882 | A1* | 8/2004 | Touyama | G10L 19/032 341/51 |
| 2007/0248276 | A1* | 10/2007 | Yahata | H04N 19/176 382/251 |
| 2008/0232465 | A1* | 9/2008 | Zhang | H04N 19/139 375/240.03 |
| 2012/0201476 | A1* | 8/2012 | Carmel | H04N 19/176 382/239 |

OTHER PUBLICATIONS

Ye, Shuiming et al., "Detecting digital image forgeries by measuring inconsistencies of blocking artifact," IEEE Int. Conf. Multimedia and Expo (ICME), Beijing, China, pp. 12-15, Jul. 2007.

Fan, Zhigang et al., "Identification of bitmap compression history: JPEG detection and quantizer estimation," IEEE Trans. Image Process., vol. 12, No. 2, pp. 230-235, Feb. 2003.

Sun, Deqing et al., "Postprocessing of low bit-rate block DCT coded images based on a fields of experts prior," IEEE Trans. Image Process., vol. 16, No. 11, pp. 2743-2751, Nov. 2007.

* cited by examiner

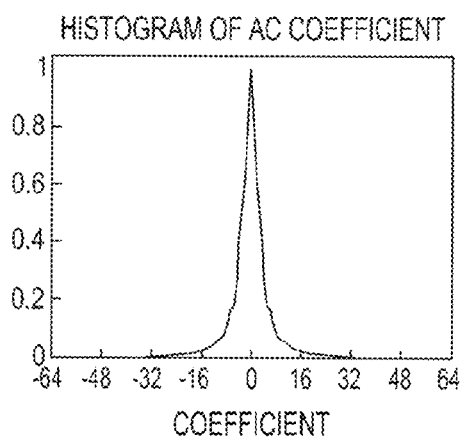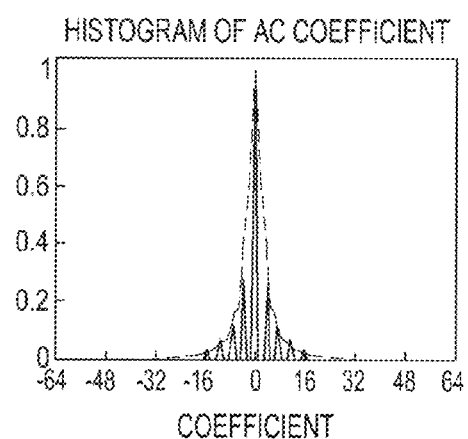
FIG.1A
(RELATED ART)
FIG.1B
(RELATED ART)

| | | | | | | |
|---|---|---|---|---|---|---|
|16|11|10|16|24|40|51|61|
|12|12|14|19|26|58|60|55|
|14|13|16|24|40|57|69|56|
|14|17|22|29|51|87|80|62|
|18|22|37|56|68|109|103|77|
|24|35|55|64|81|104|113|92|
|49|64|78|87|103|121|120|101|
|72|92|95|98|112|100|103|99|

FIG.7A

| | | | | | | |
|---|---|---|---|---|---|---|
|8|16|19|22|26|27|29|34|
|16|16|22|24|27|29|34|37|
|19|22|26|27|29|34|34|38|
|22|22|26|27|29|34|37|40|
|22|26|27|29|32|35|40|48|
|26|27|29|32|35|40|48|58|
|26|27|29|34|38|46|56|69|
|27|29|35|38|46|56|69|83|

METHOD AND APPARATUS FOR ESTIMATING A QUANTIZATION TABLE FOR A VIDEO IMAGE

PRIORITY

This application claims priority from Korean Patent Application field in the Korean Intellectual Property Office on Nov. 23, 2012 and assigned Serial No. 10-2012-0133633, the entire disclosure of which is incorporated herein by reference, in its entirety.

BACKGROUND

Field

The exemplary embodiments of the invention generally relate to a method and apparatus for image compression and estimation. More particularly, the exemplary embodiments relate to a method and apparatus for estimating a quantization table for an image.

Description of the Related Art

With respect to image compression and estimation, methods of finding quantization tables for encoded images have been studied.

As an example of finding the quantization table, a paper written by S. Ye, Q. Sun, and E. C. Chang, titled "Detecting digital image forgeries by measuring inconsistencies of blocking artifact" published in IEEE International Conference of Multimedia and Expo (ICME), Beijing, China, 2007, pages 12~15 (hereinafter referred to as [1]). The method of [1] uses a histogram of Discrete Cosine Transform (DCT) coefficients of the encoded image.

The histogram of DCT coefficients before image compression is in the continuous form, as shown in FIG. 1A. On the other hand, after quantization of DCT coefficients, a histogram as shown in FIG. 1B has large values at DCT coefficient values which correspond to integer multiples of a quantization step size Q (e.g., ±Q, ±2Q, ±3Q, . . . ) and has small values at DCT coefficient values between the integer multiples because of clipping errors in the course of making brightness values, after quantization, to have 8 bits (0~255). Using these characteristics, the method of [1] suggested a method of estimating a quantization table, as shown in FIG. 2A.

In the method of estimating a quantization table of FIG. 2A, 64 DCT coefficients are obtained by performing 8×8 block-based DCT in step 201 and a histogram is obtained for the 64 DCT coefficients in step 203. Power spectrum of the histogram is obtained through a Fourier transform, in step 205. Peaks having magnitudes more than a certain value are detected from a second-order differential graph of the power spectrum and the number of the detected peaks is counted, in step 207. The number of the peaks becomes a quantization step size for a corresponding DCT coefficient, and after completing such peak detection for all the 64 DCT coefficients, an 8×8 sized quantization table may be estimated.

FIG. 2B represents the histogram obtained in step 203, FIG. 2C represents the power spectrum obtained in step 205, and FIG. 2D represents the peaks detected from the second-order differential graph in step 207.

As another example of finding the quantization table, a paper written by Z. Fan, R. L. de Queiroz, titled "Identification of bitmap compression history: JPEG detection and quantizer estimation" publicized in IEEE Transaction of Image Process., vol. 12, no. 2, pages 230~235, 2003 (hereinafter referred to as [2]). The method of [2] also estimates a quantization table based on a histogram of the DCT coefficient values in an encoded image. Specifically, in the method of [2], the envelope of a direct current (DC) histogram is modeled with Gaussian distribution and the envelop of a remaining alternating current (AC) histogram is modeled with a Laplacian distribution (likely hood function). In the method of [2], in case of obtaining histogram values at integer multiples of a quantization step size, the maximum likely hood estimation (MLE) technique is applied to estimate the quantization step size where the DC histogram has to conform to the Gaussian distribution and the AC histogram has to conform to the Laplacian distribution.

Known methods of estimating a quantization table suggested how to obtain a quantization table to be used for a still image e.g., in a Joint Photographic Experts Group (JPEG) format.

Thus, the known methods assume to perform quantization on a number of blocks that constitute an image using a single quantization table and estimate the single quantization table that has been used in image compression using information relating to all blocks of the image (e.g., a histogram of DCT coefficients).

However, in encoding a video image in e.g., a Moving Picture Experts Group (MPEG) format, since a different quantization table is used for each block that constitutes the video image, the known method cannot be applied. Furthermore, existing methods of estimating a quantization table are rarely applied to video image encoding, because quantization needs to be performed on a residual block, which represents a difference between an image block constituting the current frame and an image block constituting the previous frame.

SUMMARY

The exemplary embodiments provide a method and apparatus for estimating a quantization table for a video image.

The exemplary embodiments also provide a method and apparatus for estimating a quantization table on a block basis that does not require coding information.

In accordance with an aspect of the exemplary embodiments, provided is a method of estimating a quantization table for an image block which is compressed during image processing, the method including performing a first quantization using a table dictionary that includes a number of candidate quantization tables for the compressed image block; performing edge-related filtering on the compressed image block and performing a second quantization using the table dictionary for the filtered compressed image block; and estimating a quantization table for the compressed image block based on energy costs of the first-quantized image block and the second-quantized image block.

In accordance with another aspect of the exemplary embodiments, an apparatus is provided for estimating a quantization table for an image block which is compressed during image processing, the apparatus including: a memory which stores a table dictionary having a number of candidate quantization tables; and a controller which performs a first quantization on the compressed image block using the table dictionary, performing edge-related filtering on the compressed image block and performing a second quantization using the table dictionary for the filtered compressed image block, and estimating a quantization table for the compressed image block based on energy costs of the first-quantized image block and the second-quantized image block.

In accordance with another aspect of the exemplary embodiments, an apparatus is provided which estimates a quantization table for an image block compressed in image processing, the apparatus including: a first quantizer for performing first quantization on the compressed image block using the table dictionary; a filter which performs edge-related filtering on the compressed image block; a second quantizer for performing second quantization on the filtered compressed image block using the table dictionary; and a calculator which estimates a quantization table for the compressed image block by calculating energy costs of the first-quantized image block and the second-quantized image block.

An exemplary embodiment may further provide an apparatus which estimates a quantization table for a compressed image block, the apparatus including: a controller which performs first quantization on a compressed image block using a table dictionary, performs edge-related filtering on the first quantized compressed image block and performs a second quantization using the table dictionary on the filtered compressed image block, and estimates a quantization table for the compressed image block based on energy costs of the first and second quantized image blocks. The apparatus may further include a memory which stores the table dictionary having a number of candidate quantization tables.

BRIEF DESCRIPTION OF THE DRAWINGS

The above and other features and advantages will become more apparent by describing in detail exemplary embodiments thereof with reference to the attached drawings in which:

FIGS. 1A and 1B show histograms of DCT coefficients before and after quantization;

FIGS. 7A and 7B show candidate quantization tables included in a table dictionary, according to an exemplary embodiment;

DETAILED DESCRIPTION OF EXEMPLARY EMBODIMENTS

Descriptions of some well-known technologies that could possibly obscure the invention will be omitted, if necessary.

As video services have become highly sophisticated, the amount of data to be processed for transmission and storage of the video data has rapidly increased in various imaging apparatuses. Thus, a coding process of the video data is required in order to reduce the amount of video image data. In the meantime, in response to the imaging apparatus performing post processing on decoded video data or receiving the decoded video image, the imaging apparatus may not be aware of the coding information of the video image data.

Therefore, exemplary embodiments suggest a method of estimating a quantization table on a block basis using information related to a decoded video image, in order to determine a level of coding of the video image.

The method of estimating the quantization table may be used to determine a post-filtering strength for image enhancement, by estimating a quality level of the video image compressed through coding.

In general, for video image coding, depending on intra/inter modes, a different quantization process is performed on each image block using a different quantization table.

The exemplary embodiments suggest a method of estimating a quantization table on a block basis which incorporates inter and intra modes without using coding information (e.g., intra or inter mode information, motion vector, etc.) of coded video data. An extent of video image compression may be determined based on values in the quantization table, or may be based on values to be multiplied by a basic quantization table may be used in the post processing. In the postprocessing, whether a signal at a particular position is the signal's natural frequency component or represents a blocking or ringing artifact may be known.

Figure 2A:
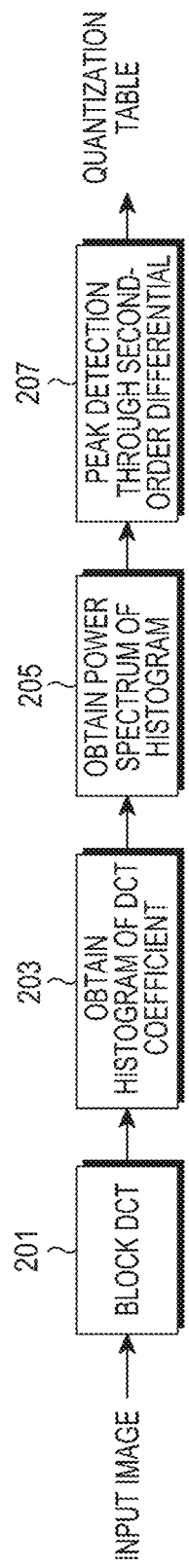
FIGS. 2A to 2D show diagrams which explain known methods of estimating a quantization table.
Figure 2B:
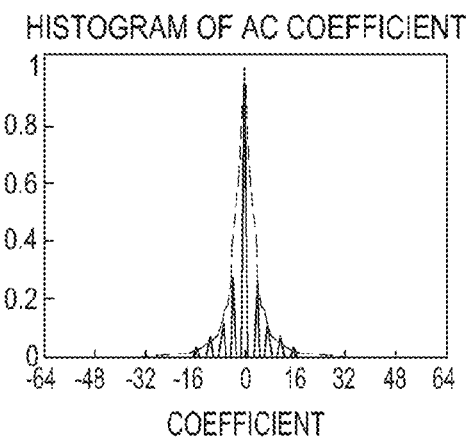
Figure 2C:
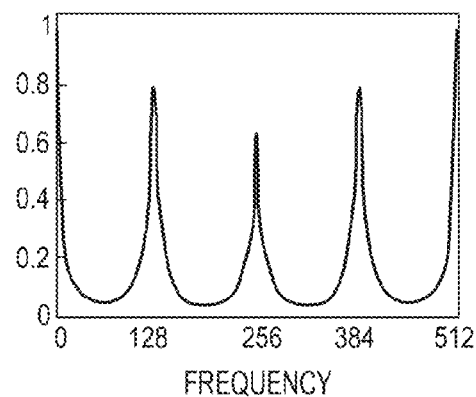
Figure 2D:
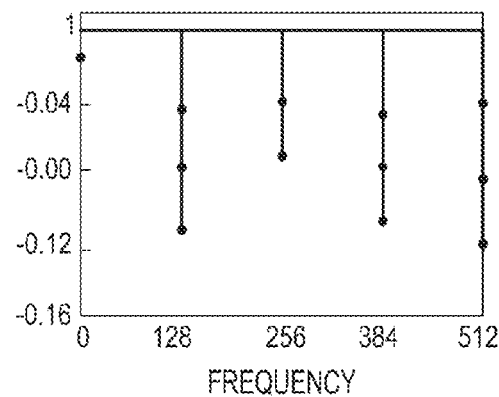
Figure 3:
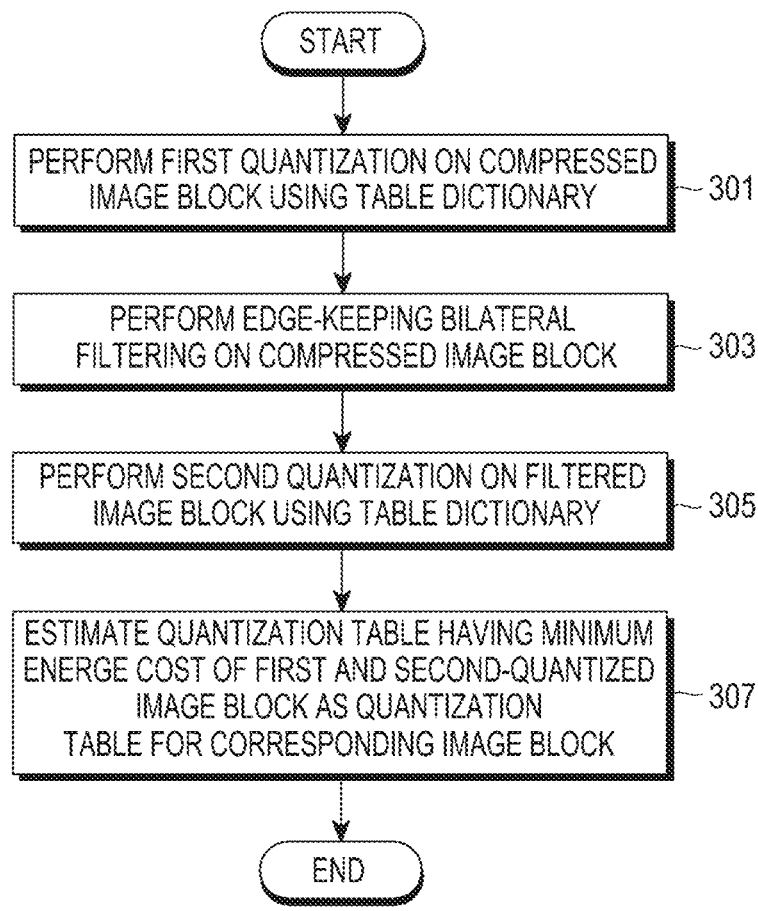
FIG. 3 is a flowchart of a method which estimates a quantization table for a compressed image block, according to an exemplary embodiment.

FIG. 3 is a flowchart of a method of estimating a quantization table for a compressed image block, according to an exemplary embodiment.

Referring to FIG. 3, in step 301, an input block, i.e., a compressed image block is quantized using each candidate quantization table in a table dictionary that has a number of candidate quantization tables. After performing DCT on the input block, the imaging apparatus may quantize DCT coefficients using all the candidate quantization tables in the table dictionary. Step 301 uses a nature of quantization that in response to the compressed image block being further quantized using the same quantization table as used in compression, the quantized image block is identical to the compressed image block. Such quantization of step 301 is referred to as "first quantization"

After step 301, or in parallel with step 301, or at the same time as step 301, the imaging apparatus may perform filtering on the input block using an edge-keeping bilateral filter, in step 303. That is, although step 303 is shown after step 301 in FIG. 3, it may be performed independently of step 301.

In step 303, the imaging apparatus may obtain a clearer image resulting from removal of the ringing artifact (which is a phenomenon that makes edges of an image look doubled) through the edge-keeping bilateral filtering. In step 303, in order to prevent the edge of the image block from being blurred, edge pixels may be found with Sobel gradient values, as expressed in Equation 1. In Equation 1, (x, y) is a positional index of the image, and | | is the absolute value operator. The way of finding the edge pixels using the following Equation 1 is well known to one of ordinary skill in the art and thus, detailed description regarding this will be omitted.

$$I_c(x,y) \text{ is an edge pixel if } |\nabla I_c(x,y)| > 0.5 \times G$$

$$G = \max|\nabla I_c(x,y)| \text{ for } x, y=0, \ldots, 7$$

$$I_c: \text{coded block, } \nabla: \text{Sobel operator} \quad (1)$$

Obtained is an image block resulting from removal of the ringing artifact through filtering by which the edge pixels keep the brightness of the compressed image block as is, while applying edge-keeping bilateral filtered values to the remaining area of the image block. The remaining area means a non-edge pixel area remained by excepting the edge pixels from the image block.

In step 305, the DCT coefficient values of the edge-keeping bilateral filtered image block of step 303 are quantized using all the candidate quantization tables in the table dictionary of step 301 and then go though inverse DCT. After the inverse DCT, edge keeping is performed on the edge pixels so that the edge pixels have the same brightness as they had prior to quantization. Step 305 uses a nature of quantization that in response to the filtered image block being quantized again using a quantization table, the quantized image block is identical to the compressed image block before filtering of the ringing artifact. Such quantization of step 305 is now referred to as "second quantization."

In step 307, the imaging apparatus calculates an energy cost of the first quantized image block and calculates an energy cost of the second quantized image block, using all the candidate quantization tables in the table dictionary; adds the energy costs, and estimates a quantization table that makes the added energy cost have the minimum to be used in compression of the input block (i.e., the compressed image block).

Although, in the foregoing exemplary embodiment, the quantization table is estimated using all the candidate quantization tables in the table dictionary, some or predetermined ones from among the all candidate quantization tables may be used in other exemplary embodiments.

Figure 4:
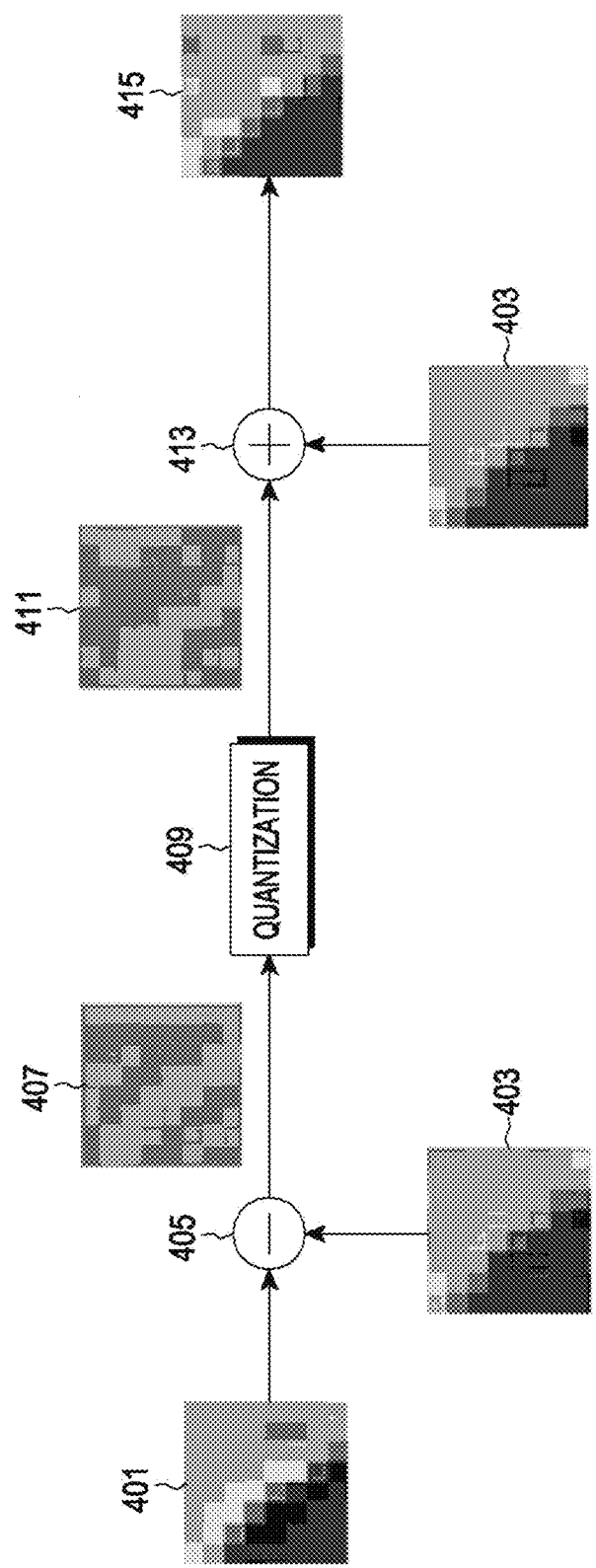
FIG. 4 shows a procedure of quantization of an image block in a frame encoded in an inter mode.

FIG. 4 shows a procedure of quantization of an image block in a frame encoded in the inter mode.

Referring to FIG. 4, in response to an input image block (hereinafter, referred to as an 'original block') 401 being input and an image block (also referred to as 'matched block') 403 in the decoded previous frame that corresponds to the original block being input, a residual block 407, the difference 405 between the original block 401 and the matched block 403, is output. The residual block 407 is quantized as shown at 409 and the quantized block 411 is then added at 413 with the matched block 403, thus resulting in a decoded image block 415.

In this regard, rather than directly quantizing DCT values of a present image block as in JPEG, MPEG intra mode coding, a residual block from the previous frame is quantized in case of inter mode coding as in FIG. 4, and increases the compression ratio.

In the meantime, according to the following [3], [4] IEEE papers, quantization noise may be modeled as additive correlated Gaussian noise.

The paper [3] to M. Robertson and R. Stevenson, is directed to "DCT quantization noise in compressed images," IEEE Transactions of Circuits Systems, Video Technologies., vol. 15, no. 1, pp. 27-38, January 2005.

The paper [4] to D. Sun and W.-K. Cham, is directed to "Postprocessing of low bit-rate block DCT coded images based on a fields of experts prior," IEEE Transaction of Image Processing, vol. 16, no. 11, pp. 2743-2751, November 2007.

The additive correlated Gaussian noise is expressed in a quantization operation as in the following Equation 2.

$$Q(y)=y+N_Q, \ N_Q: \text{Correlated Gaussian noise} \quad (2)$$

In Equation 2, y represents an image, NQ represents the additive correlated Gaussian noise, Q0 represents the quantization operation. Using the quantization noise modeling, the image block coded in the inter mode is expressed in following Equation 3.

$$P+Q(R)=P+R+N_Q$$

$$Q'(O)=Q'(P+R)=P+R+N_{Q'},$$

$$(P+Q(R))-(Q'(O))=N_Q-N_{Q'}=N$$

$$P+Q(R)=Q'(O)+N,$$

$$N: \text{Correlated Gaussian noise} \quad (3)$$

In Equation 3, P represents a reference image, R represents a residual image, Q( ) represents a quantization operator of the inter mode, and Q'( ) represents a quantization operator of the intra mode. According to Equation 3, the inter mode coded block P+Q(R) may be approximated to an error of correlated Gaussian noise N using the intra mode coded block Q'(O).

Figure 5:
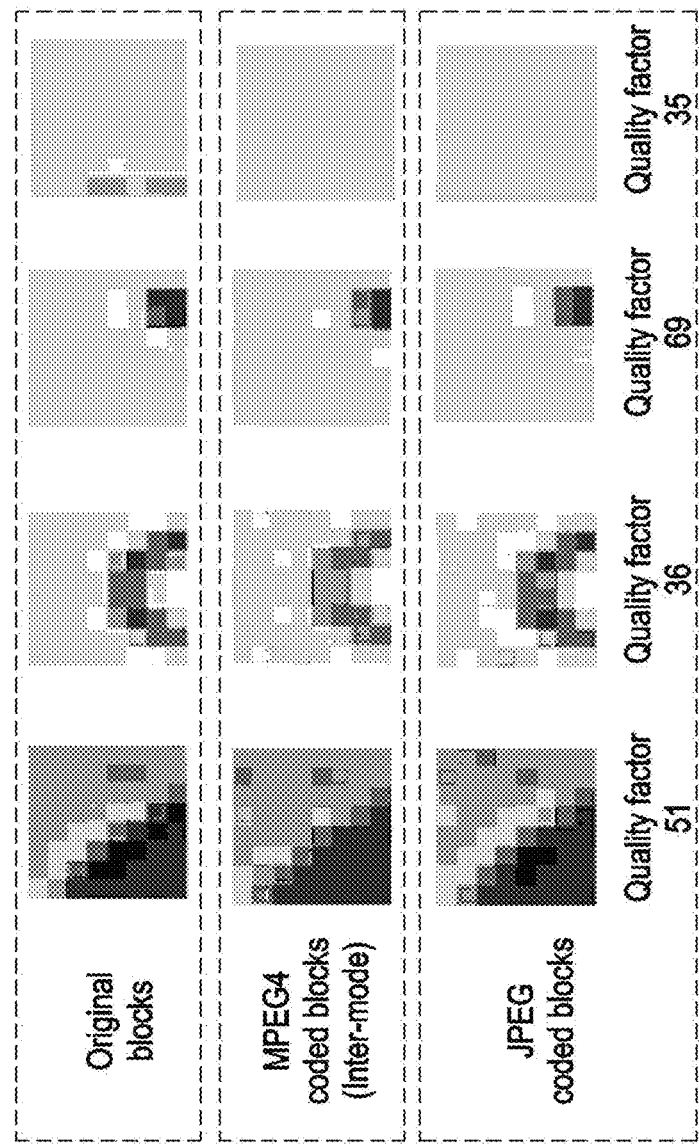
FIGS. 5A to 5C show an example of approximation of an inter mode coding block by using an intra mode coding block.

Using Equation 3, since the inter mode coded block may be approximated using the intra mode coded block, an image block (see FIG. 5C) which is substantially identical to the inter mode coded block (see FIG. 5B), may be generated through JPEG coding using intra quantization.

Figure 6:
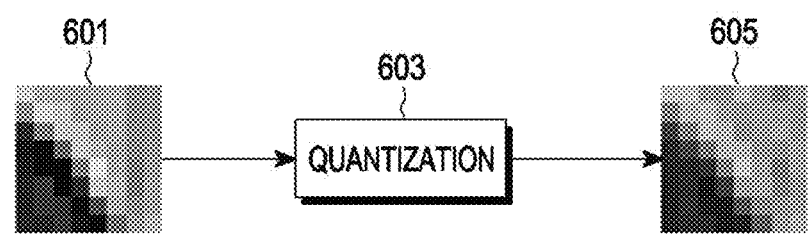
FIG. 6 shows a diagram which explains modeling into intra quantization.
Figure 8:
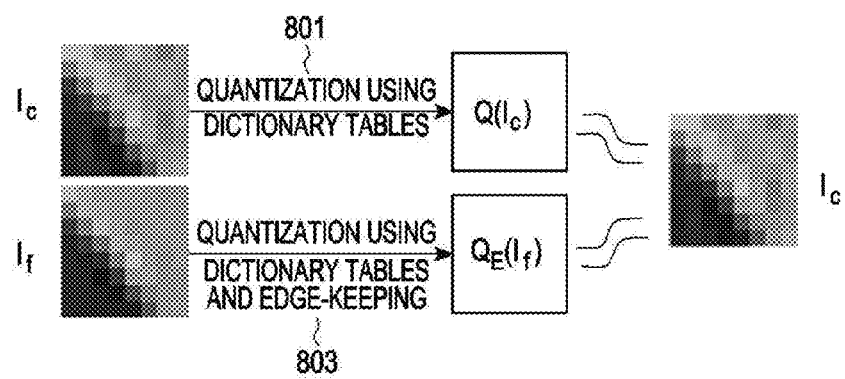
FIG. 8 shows a diagram for explaining two conditions for quantization, according to an exemplary embodiment.

Thus, for a coded video image, using the method of estimating a quantization table on a block basis according to an exemplary embodiment incorporating the inter and intra modes, rather than using the coding information, (e.g., intra or inter mode information, motion vector, etc.), distortion of an image block due to compression may be modeled in the intra quantization process and a quantization table that suits the modeling may be estimated, regardless of the mode (inter node or intra mode) of a coded image block 605, which is output by quantization 603 of an original block 601, as in FIG. 6.

FIGS. 7A and 7B show candidate quantization tables included in the table dictionary, according to an exemplary embodiment.

Referring to FIGS. 7A and 7B, the table dictionary may be comprised of a total of 100 candidate quantization tables including 70 scaled versions of e.g., a JPEG standard quantization table as shown in FIG. 7A and 30 scaled versions of an MPEG standard quantization table as shown in FIG. 7B, as candidate quantization tables. The MPEG standard quantization table may use e.g., an MPEG 1, 2 intra quantization table. The table dictionary may use JPEG and MPEG standard quantization tables and a number of quantization tables scaled from the JPEG and MPEG standard quantization tables as the candidate quantization tables. The total number and configuration of the candidate quantization tables included in the table dictionary are not limited to the above exemplary embodiment, but may be modified to different numbers and configurations.

The method of estimating a quantization table, which is most approximate to a quantization table used in compression of the original image from among the candidate quantization tables in the table dictionary as configured above, will be described below in more detail.

As in step 307 of FIG. 3, in an exemplary embodiment a quantization table identical to or most approximate to a quantization table used in quantization of the original image before compression, from among the candidate quantization tables included in the table dictionary, needs to be found from among the candidate quantization tables.

However, since the imaging apparatus may not be aware of the original image in the course of estimating the quantization table, in the exemplary embodiments, energy costs of an image block quantized in different ways that uses (combines) two conditions, below, in quantization, are obtained and a quantization table most approximate to a quantization table used in compression of the original image is estimated based on the energy costs.

Equation 4 represents an example of a way of obtaining the energy cost according to the two conditions below in an exemplary embodiment.

$$E = E_1 + E_2 \quad (4)$$
$$E_1 = SSE(Q(I_c), I_c), \ E_2 = SSE(Q_E(I_f), I_c)$$
$$Q\text{: quantization, } I_c\text{: coded block,}$$
$$I_f\text{: edge-keeping bilateral filtered block,}$$
$$Q_E\text{: quantization and edge-keeping}$$
$$SSE(J, M) = \frac{1}{64} \sum_{u,v=0}^{7} (J(u, v) - M(u, v))^2$$

In Equation 4, SSE (Sum of Square Error) represents a difference between a compressed image block and an image block which is compressed with the estimated quantization table, and the less the value of the SSE is, the less the value of the error is. In Equation 4, 'J' and 'M' means arbitrary two DCT blocks (for example, 8×8 DCT blocks) as two inputs for calculation of the SSE (J, M), $Q(I_c)$ (=J) and $I_c$(=M) are used as two inputs of $E_1$, and $Q_E(I_f)$ (=J) and $I_c$(=M) are used as two inputs of $E_2$.

A first condition is that in a case where a compressed image block (also, referred to as a 'compressed block') is quantized using a quantization table once again, the quantized compressed block needs to be similar to the compressed block prior to the quantization. The first condition is to use a nature of the quantization that a once-quantized image block is identical to or similar to a twice-quantized image block. The quantization is performed with a quantization table used in a compression.

A second condition is that when an image block resulting from edge-keeping bilateral filtering through which it is to retain strong edges and eliminate the ringing artifact from a compressed block, is deemed as a clear original block. In response to the filtered compressed block being quantized again using a quantization table, the ringing artifact generated in the quantized compressed block must be identical or similar to that of the compressed block prior to the filtering.

Reference numeral 801 represents the first quantization based on the first condition, and reference numeral 803 represents the second quantization based on the second condition. The quantization based on the two conditions may be performed in sequence or in parallel.

Using the two conditions, a first energy cost of the image block first-quantized in step 307 of FIG. 3 corresponds to E1 in Equation 4, and a second energy cost of the second quantized image block corresponds to E2 in equation 4. The imaging apparatus estimates a quantization table from among a number of candidate quantization tables that makes addition E of the first energy cost E1 and the second energy cost E2 have the minimum as a quantization table used in compression of the input block, i.e., a compressed image block.

Figure 9:
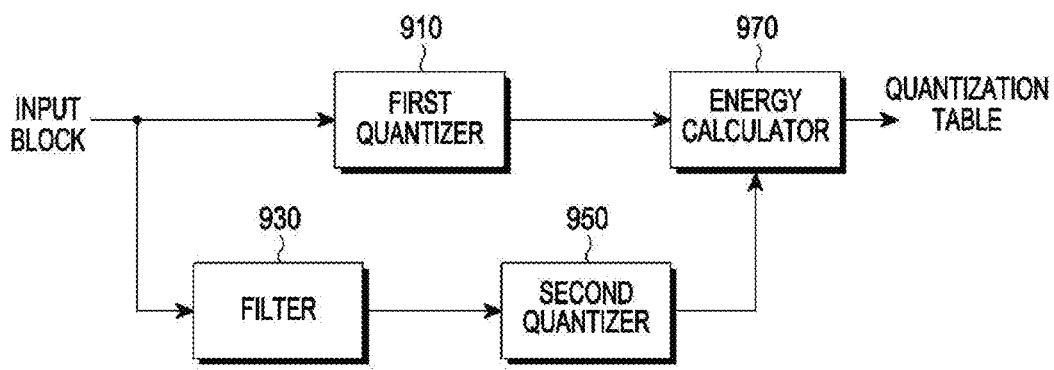
FIG. 9 is a block diagram of an apparatus for estimating a quantization table of a compressed image block, according to an exemplary embodiment.

FIG. 9 is a block diagram of an apparatus which estimates a quantization table for a compressed image block, according to an exemplary embodiment.

Referring to FIG. 9, the first quantizer 910 performs the first quantization on an input block, i.e., a compressed image block using the table dictionary that includes a number of candidate quantization tables. The compressed image block is input to a filtering unit 930 which in turn performs the edge-keeping bilateral filtering on the compressed image block. The filtered image block is input to a second quantizer 950 and the second quantizer 950 performs the second quantization using the same table dictionary as used by the first quantizer 910.

An energy calculator 970 respectively calculates first and second energy costs of the first and second quantized image blocks, and estimates a quantization table from among the candidate quantization tables that makes the addition of the first energy cost and the second energy cost have a minimum as a quantization table of the image block.

Although not shown, the apparatus for estimating a quantization table, as shown in FIG. 9, may be implemented in various imaging apparatuses, including a controller (e.g., at least one processor) which performs the first and second quantization and the edge-keeping bilateral filtering and a memory which stores the table dictionary.

Figure 10A:
FIGS. 10A, 10B, 10C and 11 show results of estimation of a quantization table, according to an exemplary embodiment.
Figure 10B:
Figure 10C:

FIGS. 10A to 10C show results from estimation of the quantization table, according to an exemplary embodiment.

FIG. 10A represents a frame having the original image before compression; FIG. 10B represents a frame having an image block after compression; and FIG. 10C represents a frame having an image block which results from quantization of the original image of FIG. 10A. By comparison, two images of FIGS. 10B and 10C are shown to be quite similar to each other, which means that the method of estimating a quantization table according to an exemplary embodiment is effective.

Figure 11:
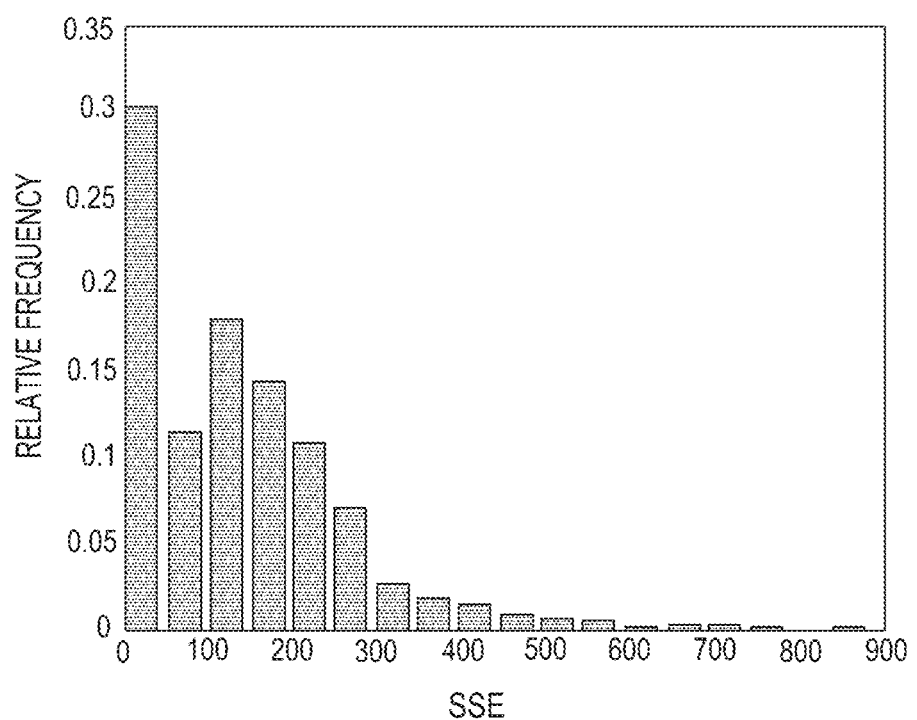

FIG. 11 shows results from estimation of the quantization table according to an exemplary embodiment in SSE (Sum of Square Error) distribution. In FIG. 11, the SSE represents a distribution of errors, i.e., differences between compressed image blocks and image blocks compressed with the estimated quantization table, and is seen to be concentrated at smaller values. This establishes that the results from estimation of the quantization table according to the exemplary embodiments are effective.

The method of estimating a quantization table according to an exemplary embodiment may be applied to an algorithm in order to eliminate compression noise, such as blocking and ringing artifacts.

QCS (Quantization Constraint Set) is a widely used method for post processing to prevent edge blurring in filtering in order to reduce known compression noise and increase the gain. As expressed in Equation 5, the range of a DCT coefficient $Z_{origin}(u,v)$ of the original image before quantization is limited by a quantization step size Q(u,v).

$$Z_{origin}(u, v) \in [Z^{min}(u, v), Z^{max}(u, v)] \quad (5)$$
$$\begin{cases} Z^{min}(u, v) = Z(u, v) - Q(u, v) \times 0.5 \\ Z^{max}(u, v) = Z(u, v) + Q(u, v) \times 0.5 \end{cases}$$
$$Z\text{: DCT of a quantized block}$$

In case of performing deblocking and deringing filtering to reduce the compression noise, the range of a filtered DCT coefficient value may exceed a range that a DCT coefficient of the original image may have. In this case, image oversmoothing occurs, thus leading to degradation of the resolution of an image.

Thus, clipping the value of a filtered DCT coefficient $Z_f(u,v)$ to be within the range predetermined by the quantization step size Q(u,v) may prevent the degradation of the resolution.

$$\hat{Z}_f(u, v) = \begin{cases} Z^{min}(u, v), & \text{if } Z_f(u, v) < Z^{min}(u, v) \\ Z_f(u, v), & \text{if } Z^{min}(u, v) \leq Z_f(u, v) \leq Z^{max}(u, v) \\ Z^{max}(u, v), & \text{if } Z_f(u, v) > Z^{max}(u, v) \end{cases} \quad (6)$$

In processing a video image, there may be a loss in the course of encoding the video image to reduce the amount of data for transmission/reception and storage of the video data, which causes degradation of quality of the video image. The exemplary embodiments may predict a compression level and an image quality of an image block on a block basis by estimating a quantization table of each image block within a frame by using image information.

The exemplary embodiments may further determine a suitable filtering strength at a post processing filtering stage which enhances the quality of an image input through D-sub terminal or through DVI (Digital Visual Interface)/HDMI (High-Definition Multimedia Interface) terminals of various imaging apparatuses, based on the estimated quantization table.

Several exemplary embodiments have been described, but it will be understood that various modifications can be made without departing from the spirit and scope of the disclosure. Thus, it will be apparent to those of ordinary skill in the art that the invention is not limited to the described exemplary embodiments, but can encompass not only the appended claims but also equivalents.

What is claimed is:

1. A method of estimating a quantization table, which was used in compression and encoding of an image block for post process filtering video output from a video decoder, the method comprising:
    receiving a decoded image block from the output of the video decoder,
    performing, by a processor, a first quantization on the image block using respective candidate quantization tables to obtain a first-quantized image block, and obtaining a first energy cost of the first-quantized image block corresponding to the respective candidate quantization tables;
    edge-related filtering, by the processor, the compressed image block and performing a second quantization on the filtered compressed image block using the respective candidate quantization tables to obtain a second-quantized image block, and obtaining a second energy cost of the second-quantized image block corresponding to the respective candidate quantization tables;
    estimating, by the processor, one of the candidate quantization tables based on the first energy costs and the second energy costs obtained by the candidate quantization tables as the quantization table that was used in compression and encoding of the image block at a video encoder; and
    post process filtering the decoder image block using the estimated candidate quantization table.

2. The method of claim 1, wherein the estimated quantization table is associated with a minimum energy cost value resulting from an addition of the first energy cost of the first-quantized image block and the second energy cost of the second-quantized image block.

3. The method of claim 1, wherein the edge-related filtering comprises edge-keeping bilateral filtering.

4. The method of claim 1, wherein the first quantization and the second quantization are performed on the compressed image block in different operations.

5. The method of claim 1, wherein the candidate quantization tables includes JPEG and MPEG standard quantization tables and quantization tables scaled from the JPEG and MPEG standard quantization tables.

6. The method of claim 1, wherein the first energy cost is calculated based on a condition of determining that the twice-quantized image block is identical to the once-quantized image block in response to the once-quantized image block being quantized again using the same quantization table.

7. The method of claim 1, wherein the second energy cost is calculated based on a condition of determining that in response to the filtered compressed image block after the edge-related filtering being quantized again using the same quantization table, ringing generated in the filtered compressed image block that is quantized again is identical to that of the compressed image block prior to the edge-related filtering.

8. An apparatus for estimating a quantization table, which was used in compression and encoding of an image block for post process filtering of a decoded video, the apparatus comprising:
    a memory which stores candidate quantization tables; and
    a controller, which receives a decoded image block from an output of a video decoder, obtains a first energy cost of each of first-quantized image blocks by performing a first quantization on a compressed image block using respective candidate quantization tables, obtains a second energy cost of each of second-quantized image blocks by edge-related filtering the compressed image block and performing a second quantization on the filtered compressed image block using the respective candidate quantization tables, and estimates one of the candidate quantization tables based on the first energy costs and the second energy costs obtained by the candidate quantization tables as the quantization table that was used in compression and encoding of the image block at a video encoder, and post process filters the decoded image block using the estimated candidate quantization table.

9. The apparatus of claim 8, wherein the estimated quantization table is associated with a minimum energy cost value resulting from an addition of the first energy cost of the first-quantized image block and the second energy cost of the second-quantized image block.

10. The apparatus of claim 8, wherein the edge-related filtering comprises edge-keeping bilateral filtering.

11. The apparatus of claim 8, wherein the first quantization and the second quantization are performed on the compressed image block in different operation.

12. The apparatus of claim 8, wherein the candidate quantization tables includes JPEG and MPEG standard quantization tables and quantization tables scaled from the JPEG and MPEG standard quantization tables.

13. The apparatus of claim 8, wherein the first energy cost is calculated based on a condition of determining that the twice-quantized image block is identical to the once-quantized image block in response to the once-quantized image block being quantized again using the same quantization table.

14. The apparatus of claim 8, wherein the second energy cost is calculated based on a condition of determining that in response to the filtered compressed image block after the edge-related filtering being quantized again using the same quantization table, ringing generated in the filtered compressed image block quantized again is identical to that of the compressed image block prior to the edge-related filtering.

* * * * *